United States Patent
Jin et al.

(10) Patent No.: US 9,094,468 B2
(45) Date of Patent: Jul. 28, 2015

(54) DEVICE CAPABILITY INVOCATION METHOD, WIDGET DEVICE, SERVER

(75) Inventors: Hongbo Jin, Shenzhen (CN); Haifang Fu, Beijing (CN); Wangbin Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 352 days.

(21) Appl. No.: 13/294,659

(22) Filed: Nov. 11, 2011

(65) Prior Publication Data

US 2012/0059836 A1  Mar. 8, 2012

Related U.S. Application Data

(63) Continuation of application No. PCT/CN2010/072655, filed on May 12, 2010.

(30) Foreign Application Priority Data

May 12, 2009 (CN) .......................... 2009 1 0138673

(51) Int. Cl.
*G06F 15/173* (2006.01)
*H04L 29/08* (2006.01)
(Continued)

(52) U.S. Cl.
CPC ............. *H04L 67/303* (2013.01); *H04L 29/06* (2013.01); *H04L 29/08144* (2013.01); *H04W 4/001* (2013.01); *H04L 67/125* (2013.01)

(58) Field of Classification Search
CPC ..................... H04L 29/08144; H04L 29/06
USPC ................... 709/215–217, 224–226
See application file for complete search history.

(56) References Cited

U.S. PATENT DOCUMENTS

| 8,265,595 B1* | 9/2012 | Reeves et al. | 455/410 |
| 2005/0257191 A1* | 11/2005 | Underseth et al. | 717/106 |

(Continued)

FOREIGN PATENT DOCUMENTS

| CN | 101005483 | 7/2007 |
| CN | 101146346 A | 3/2008 |

(Continued)

OTHER PUBLICATIONS

International Search Report from P.R. China in International Application No. PCT/CN2010/072655, mailed.

(Continued)

*Primary Examiner* — Chris Parry
*Assistant Examiner* — Weiwei Stiltner
(74) *Attorney, Agent, or Firm* — Conley Rose, P.C.; Grant Rodolph; Nicholas K. Beaulieu

(57) ABSTRACT

The present invention relates to communication technologies, and discloses a device capability invocation method, a widget device, and a server. The device capability invocation method includes: receiving a device capability invocation request sent by a widget, where the device capability invocation request carries conditions of a device capability that needs to be invoked; search a device capability database for the device capability compliant with the conditions; invoking the found device capability; receiving an invocation result that is returned after the found device capability is invoked; and sending the invocation result to the widget. The technical solutions provided by the embodiments of the present invention enables a widget device to invoke device capabilities of all devices in the system.

15 Claims, 6 Drawing Sheets

(51) Int. Cl.
*H04L 29/06* (2006.01)
*H04W 4/00* (2009.01)

(56) References Cited

U.S. PATENT DOCUMENTS

| | | | |
|---|---|---|---|
| 2007/0067310 A1* | 3/2007 | Gupta et al. | 707/10 |
| 2008/0018924 A1* | 1/2008 | White et al. | 358/1.13 |
| 2008/0104196 A1* | 5/2008 | Yalakanti et al. | 709/217 |
| 2008/0154951 A1 | 6/2008 | Martinez et al. | |
| 2008/0162677 A1* | 7/2008 | Coatney et al. | 709/223 |
| 2009/0033976 A1* | 2/2009 | Ding | 358/1.15 |
| 2009/0063710 A1* | 3/2009 | Sekine et al. | 710/1 |
| 2009/0094339 A1* | 4/2009 | Allen et al. | 709/206 |
| 2009/0111467 A1 | 4/2009 | Chai et al. | |
| 2009/0113461 A1 | 4/2009 | Zhou et al. | |
| 2010/0153577 A1* | 6/2010 | Wohlert et al. | 709/231 |
| 2011/0179273 A1* | 7/2011 | Hjelm et al. | 713/168 |

FOREIGN PATENT DOCUMENTS

| | | |
|---|---|---|
| CN | 101271403 | 9/2008 |
| WO | WO0171977 A3 * | 9/2001 |

OTHER PUBLICATIONS

Written Opinion of the International Search Authority related to International Application No. PCT/CN2010/072655; completed on Aug. 10, 2010, for Huawei Technologies Co., Ltd.

* cited by examiner

DEVICE CAPABILITY INVOCATION METHOD, WIDGET DEVICE, SERVER

CROSS-REFERENCE TO RELATED APPLICATIONS

This application is a continuation of International Application No. PCT/CN2010/072655, filed on May 12, 2010, which claims priority to Chinese Patent Application 200910138673.2, filed on 12 May, 2009, both of which are hereby incorporated by reference in their entireties.

FIELD OF THE INVENTION

The present invention relates to communication technologies, and in particular, to a device capability invocation method, a widget device, and a server.

BACKGROUND OF THE INVENTION

With development of network technologies, more and more applications can be executed through a network. For example, a device can be controlled and managed through a network so that an operator of the device can control and manage the device without visiting the site, which quickens the processing.

The following is a method for controlling devices through a network in the prior art:

Devices controllable by a client are preset for the client, and the client are preset correspondingly. The settings for the client include specifying the devices controllable by the client; and the settings for the device include specifying the clients capable of controlling the device. After the client and the devices are preset, the user may send a remote device control request to a server through the client (or browser) according to the settings. The remote device control request may specify remote devices that need to be controlled, or provide only query conditions with which the server can searches out the corresponding remote devices. The client may communicate with the server through a standard protocol.

After receiving the remote device control request from the client, the server determines which remote device that needs to be controlled on the client side; searches a maintained database for protocol mapping rules of the remote device, the server then obtains a private protocol of the remote device according to the control instruction in the standard protocol, and forwards the control request to the remote device.

The remote device returns the corresponding result to the server through the private protocol, and the server returns the result to the client through the standard protocol.

In the process of researching the prior art, the inventor finds that: through the existing method mentioned above, the client can control some devices remotely through a server, but the client and the devices need to be set before the control is exercised. Therefore, a client is only capable of controlling the devices which are set as allowing control, and a device can only be controlled by the clients which are set as being capable of controlling the device. That is, the capabilities of a device can only be invoked by the set clients, and other clients that are not set are incapable of invoking the capabilities of the device, and as a result, the device resources in the system cannot be made full use of.

SUMMARY OF THE INVENTION

The embodiments of the present invention provide a device capability invocation method, a widget device, and a server so that the widget device can invoke device capabilities of all devices.

A device capability invocation method provided in an embodiment of the present invention includes:
receiving a device capability invocation request sent by a widget, where the device capability invocation request carries conditions of a device capability that needs to be invoked;
searching a device capability database for the device capability compliant with the conditions;
invoking the found device capability;
receiving an invocation result that is returned after the found device capability is invoked; and
sending the invocation result to the widget.

A widget device provided in an embodiment of the present invention includes:
a receiving unit, configured to receive a device capability invocation request sent by a widget, where the device capability invocation request carries conditions of a device capability that needs to be invoked;
a searching unit, configured to search a device capability database for the device capability compliant with the conditions;
an invoking unit, configured to invoke the device capability found by the searching unit; and
a sending unit, configured to send to the widget an invocation result received by the receiving unit.

The receiving unit is further configured to receive the invocation result that is returned after the device capability found by the searching unit is invoked by the invoking unit.

A widget device provided in an embodiment of the present invention includes:
a receiving unit, configured to receive a device capability invocation request sent by a widget, where the device capability invocation request carries conditions of a device capability that needs to be invoked; and
a sending unit, configured to send the device capability invocation request to a device capability server through a widget server, so as to instruct the device capability server to search an overall device capability database for the device capability compliant with the conditions and invoke the found device capability.

The receiving unit is further configured to receive an invocation result sent by the device capability server; and the sending unit is further configured to send the invocation result received by the receiving unit to the widget.

A server provided in an embodiment of the present invention includes:
a receiving unit, configured to receive a device capability invocation request sent by a widget device through a widget server, where the device capability invocation request carries conditions of a device capability that needs to be invoked;
a searching unit, configured to search an overall device capability database for the device capability compliant with the conditions;
an invoking unit, configured to invoke the device capability found by the searching unit; and
a sending unit, configured to send an invocation result received by the receiving unit to the widget device.

The receiving unit is further configured to receive the invocation result that is returned after the device capability found by the searching unit is invoked by the invoking unit.

The foregoing technical solutions provided by the embodiments of the present invention reveal that: In the embodiments of the present invention, the widget device can run a widget that needs to invoke device capabilities, receive a device capability invocation request sent by the active widget, search a device capability database for a device capability, invoke the found device capability, and obtain an invocation result. Therefore, the widget can be executed correctly, and capabilities of devices in the system can be invoked by other devices, so as to make full use of system resources.

BRIEF DESCRIPTION OF THE DRAWINGS

To describe the technical solutions of embodiments of the present invention or in the prior art more clearly, the following outlines the accompanying drawings involved in description of the embodiments of the present invention or the prior art. Apparently, the accompanying drawings are illustrative rather than exhaustive, and persons of ordinary skill in the art can derive other drawings from them without any creative effort.

DETAILED DESCRIPTION OF THE EMBODIMENTS

Figure 1:
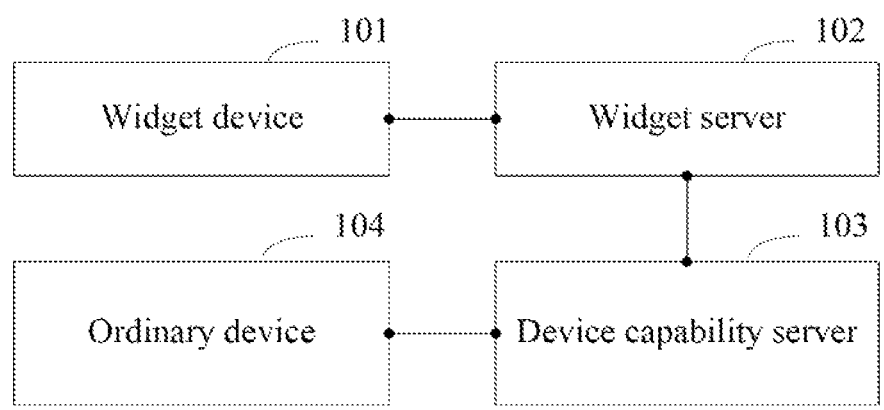
FIG. 1 is a system architecture diagram according to an embodiment of the present invention.

The technical solutions of the embodiments of the present invention are clearly and completely described in conjunction with the accompanying drawings. Evidently, the described embodiments are merely some rather than all embodiments of the present invention. All other embodiments, which can be derived by those skilled in the art from the embodiments given herein without any creative effort, shall fall within the protection scope of the present invention.

First, a widget involved in embodiments of the present invention is introduced. A widget is a web-based applet for implementing a specific function. Widgets have now been applied to various desktop operating systems and mobile phone operating systems.

A widget may be regarded as a custom web page that runs outside a browser interface. Each widget is oriented to a specific lightweight task. A widget can be compiled simply with Hypertext Markup Language (HTML) and Cascading Style Sheet (CSS). However, to make the widget really applicable, logic operations are required. Therefore, most widgets involve JavaScript and EXtensible Markup Language (XML). Because the widget is based on web, the widget is compact and lightweight, easy to develop, and involves few couplings with the operating system and has complete functions. The application environment of widgets falls between a Browser/Server (BS) architecture and a Client/Server (CS) architecture, and draws upon merits of both the BS architecture and the CS architecture. The widget does not depend on networks completely. The software framework of the widget may exist locally, and the content resources may be obtained from the network. The program codes and the User Interface (UI) design may be updated in line with a dedicated server. Therefore, the widget retains flexibility of a BS architecture.

As a special "webpage", a widget is changing the mode of accessing the Internet, enables the user to access web without depending on the browser, and enables the user to implement web functions through those applets. The widget also provides completely new user experience. Through a widget, the user can customize various desired services, individualize desktops randomly, and experience the compact and cool style of the widget. It is remarkable that with the change of the requirements of Internet users and the development of the widget technology, the application of widgets is not limited to Personal Computer (PC) desktops, but is extended into other fields such as webpage widget, mobile widget, man-machine interaction widget, and even widget-specific terminals.

A mobile widget is a widget that runs on a mobile terminal. The application framework of mobile widgets is very suitable for mobile terminals. A mobile terminal has a relatively smaller screen, but the browser occupies the limited screen resource, which deteriorates the user experience of accessing the web on a mobile phone. The mobile widget can run independently of the browser, makes use of the mobile phone screen efficiently, and access the mobile Internet quickly and conveniently. The mobile widget brings good presence mode and Internet experience to mobile users. Mobile widgets are compact, lightweight, easy to develop, and based on standard web technologies. The barrier for developing mobile widgets is low, and plenty of potential developers of mobile widgets exist. The mobile widgets involve few couplings with the operating system, and have complete functions. Because mobile widgets run on mobile terminals, they have other features. Firstly, mobile widgets can implement individualized user interfaces, and make each mobile phone unique easily. Secondly, mobile widgets can implement many applications suitable for mobile scenarios, for example, web applications related to environment or location. Thirdly, services and contents specific to mobile widgets help a user obtain useful information easily, reduce traffic, and avoid additional traffic brought by redundant data transmission. Finally, mobile widgets provide good means of publishing mobile phone advertisements.

As shown in FIG. 1, a system architecture involved in an embodiment of the present invention includes a widget device 101, a widget server 102, a device capability server 103, and an ordinary device 104.

The widget device 101 such as a mobile phone, PC, or Mobile Internet Device (MID) has a widget engine and can run widgets, and at least one widget device 101 exists in the system. The ordinary device 104, such as a camera or printer, is a device that cannot be installed with widget engines, and at least one ordinary device 104 exists in the system. The widget server 102 and the device capability server 103 may be located on the same entity, or on located different entities.

The widget device 101 can communicate with the widget server 102 through a widget protocol. The widget server 102 can communicate with the device capability server 103 through the widget protocol. The ordinary device 104 can communicate with the device capability server 103 through a standard protocol (such as standard device capability registration protocol and standard device capability invocation protocol), or each ordinary device 104, through its respective private protocol, communicates with the device capability server 103. Both the widget device 101 and the ordinary device 104 can open their device capabilities, and register the device capabilities into the device capability server 103 for being invoked by the widget. A widget can invoke capabilities opened by the widget device that runs the widget, and invoke capabilities opened by other widget devices and ordinary devices. In other words, the widget can invoke all capabilities registered in the device capability server 103.

In an embodiment of the present invention, to invoke and describe the device capabilities in the whole system uniformly, a device capability description standard is defined to enumerate probable capabilities of all devices and standardize names. The device capability description standard provides a standard and basis for opening device capabilities. Subsequently, widget developers can use a standard interface in a widget script to access device capabilities.

Table 1 shows a device capability description standard in an embodiment of the present invention.

TABLE 1

| Device capability description | Standard name | Input parameter | Output parameter |
|---|---|---|---|
| Vibration | widget.vibrate | elapse:int span:int | |
| Ring tone | widget.tune | tune_id:int elapse:int volume:int | |
| Backlight | widget.light | elapse:int | |
| Browser | widget.browser | url:string | |
| Camera | widget.camera | mode:int | img:Image |
| Temperature | widget.temperature | city: string mode: int | temperature: double |
| Humidity | widget.humidity | city:string | humidity:double |
| ... | ... | ... | ... |

In Table 1, "Device capability description" specifies the type of device capability, "standard name" defines how the widget invokes the device capability in a script, "input parameter" specifies the number of input parameters that need to be set for invoking the device capability and specifies the type of each input parameter, the characters before ":" are a parameter name, and the characters after ":" are value type of the parameter. For example, "volume:int" means that the name of a parameter that is used for invoking a ring tone is "volume", and the value type of the parameter is "int". "Output parameter" specifies the output result that can be obtained after the device capability is invoked. If the output result is null, it indicates that no result is returned. For example, "img:image" means that a parameter name of an invocation result returned at the time of invoking a camera is "img", and the value type of the parameter is "Image". For example, for the purpose of invoking a widget.humidity capability, the widget needs to provide a parameter "city" of a string type. After the invocation is completed, the widget can obtain a humidity value of a "double" type as a result. After the device capability description standard described in Table 1 is applied, if the widget developer wants to compile a widget for perceiving the current temperature of a city, the developer may add a script-like statement such as "var tp=widget.temperature('beijing')" in a widget script file to obtain the current temperature of Beijing.

The device capability server 103 maintains a device capability database. The device capability database may be an overall device capability database. The overall device capability database stores registered capabilities of devices in the system. The devices in the system include widget device 101 and ordinary device 104. The device capabilities in the overall device capability database can be invoked by the widget device in the system.

In an embodiment of the present invention, a widget device 101 can register device capabilities in the overall device capability database through the following procedure: The widget device 101 probes the device capabilities of the widget device 101, and sends the probed device capabilities to the widget server 102. The widget server 102 sends the device capabilities probed by the widget device 101 to the device capability server 103. The device capability server 103 registers the device capabilities probed by the widget device into the overall device capability database.

In an embodiment of the present invention, an ordinary device 104 may register device capabilities into the overall device capability database of the device capability server 103 through the following procedure: The ordinary device 104 is started up and connected to the device capability server 103; the ordinary device 104 communicates its own device capabilities, the value range of the input parameters and the value range of the output parameters to the device capability server 103 through a corresponding device capability registration protocol, and executes the process of registering the device capabilities. The ordinary device 104 may obtain its own device capabilities from its configuration files.

When the ordinary device 104 communicates with the device capability server 103 through a standard device capability registration protocol, the device capability server 103 may directly store in the overall device capability database the ordinary device 104's device capabilities that need to be registered.

When the ordinary device 104 communicates with the device capability server 103 through a private device capability registration protocol, the device capability server 103 may convert the device capabilities described through a private device capability registration protocol into device capabilities described through a device capability description standard in order to make the device capabilities in the device capability database comply with the device capability description standard. Because the ordinary devices may support different private device capability registration protocols, the device capability server 103 may maintain a device capability registration protocol database in order to make the device capability server 103 convert the device capabilities sent by each ordinary device through a private device capability registration protocol. In this way, after an ordinary device 104 sends its device capabilities through a private device capability registration protocol, the device capability server 103 can convert the device capabilities directly according to the records in the device capability registration protocol database without performing ergodic matching for all private device capability registration protocols, so as to improve the conversion speed.

Table 2 shows formats of records in a device capability registration protocol database maintained by a device capability server 103 in an embodiment of the present invention.

TABLE 2

| Device ID | Device capability | Device capability registration protocol |
|---|---|---|
| Device1 | widget.vibrate | Register Vibrate /elapse /span |
| Device2 | widget.vibrate | Register Tremble /elapse /span |
| Device1 | widget.tune | Register Tune /tune_id /elapse /volume |
| Device2 | widget.tune | Register Beep /elapse /volume |
| Device1 | widget.light | Register Flash -elapse |
| Device7 | widget.camera | Register Record -mode |
| ... | ... | ... |

In Table 2, "device ID" is a unique ID of the device, and may be allocated to each device (including ordinary device 104 and widget device 101) in the system beforehand; "device capabilities" refer to capabilities that the device may have; and "device capability registration protocol" refers to the device capability registration protocol that may be used by the device for registering the device capabilities.

In an embodiment of the present invention, the device capabilities recorded in the overall device capability database may be registered through a centralized input manner, namely, the device capabilities of the devices in the system are input manually into the overall device capability database.

Table 3 shows formats of records in an overall device capability database maintained by a device capability server 103 in an embodiment of the present invention. In Table 3, "elapse:int:[1 . . . 100]" means that a parameter name used for invoking "widget.vibrate" is elapse, the value type of elapse is int, and the value range or elapse is [1 . . . 100]. "img:Image: [png,bmp]" means that a parameter name of an invocation result returned at the time of invoking "widget.camera" is img, the value type of img is Image, and the value range of Image [png,bmp]. That is, at the time of invoking a camera, the invocation result output by the camera is a picture, and the format of the picture may be png or bmp.

TABLE 3

| Device capability | Device ID | Range of input parameter | Range of output parameter |
|---|---|---|---|
| widget.vibrate | Device1 | elapse:int:[1..100] span:int:[1..5] | |
| widget.tune | Device2 | tune_id:int:[1..31] elapse:int volume:int:[1..50] | |
| widget.light | Device2 Device3 | elapse:int | |
| widget.camera | Device1 Device2 Device3 | mode:int[1,2,4] | img:Image:[png,bmp] |
| . . . | . . . | . . . | . . . |

Because the widget device 101 may also invoke its own device capabilities, the widget device 101 may also maintain a device capability database in order to quicken invocation of its own device capabilities. The device capability database may be a local device capability database that stores device capabilities registered by the local device (namely, the widget device itself). In other words, the local device capability database stores device capabilities that are registered by the widget device itself and are allowed to be invoked by the widget. Table 4 shows formats of records in a local device capability database maintained by a widget device 101 in an embodiment of the present invention.

TABLE 4

| Device capability | Range of input parameter | Range of output parameter |
|---|---|---|
| widget.vibrate | elapse:int:[1..100] span:int:[1..5] | |
| widget.tune | tune_id:int:[1..3] elapse:int volume:int:[1..50] | |
| widget.light | elapse:int | |
| widget.camera | mode:int:[1,2,4] | img:Image:[png,bmp] |
| . . . | . . . | . . . |

A local device capability database is maintained on the widget device 101. When the widget device invokes its own device capabilities, the widget server 102 invokes the capabilities from the local device directly rather than from the device capability server 103, so as to the speed of invoking the device capabilities.

Figure 2:
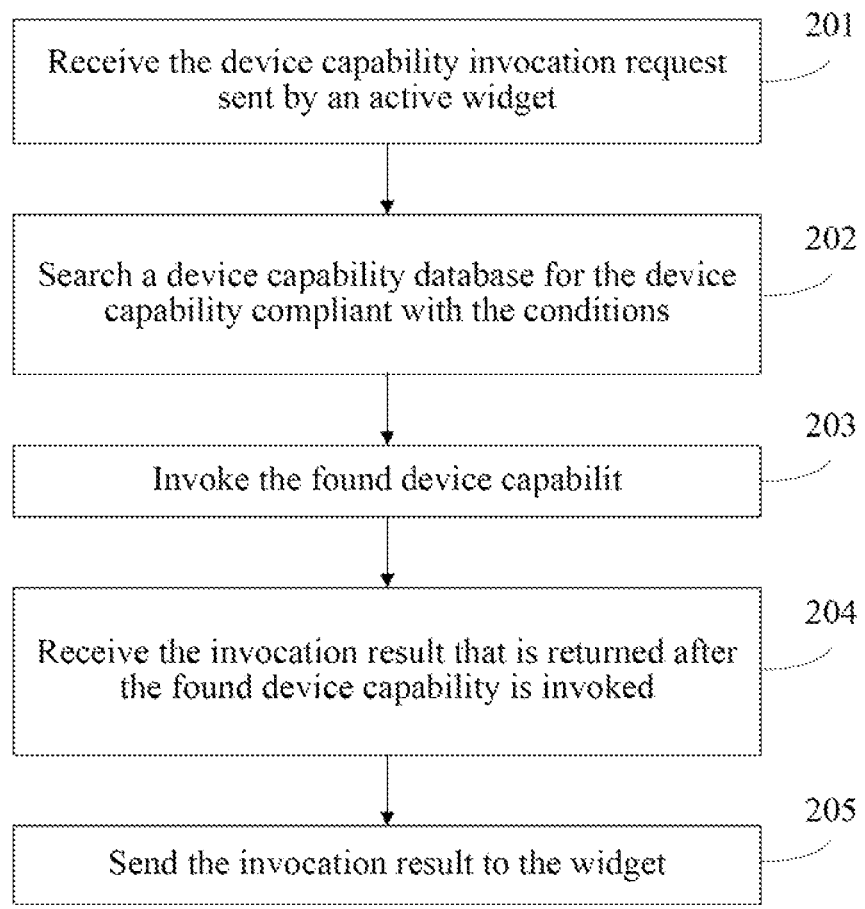
FIG. 2 is a flowchart of a device capability invocation method according to a first embodiment of the present invention.

The following describes the device capability invocation method provided in an embodiment of the present invention. FIG. 2 is a flowchart of a device capability invocation method in a first embodiment of the present invention. This embodiment describes a processing procedure of a widget device. The processing procedure includes the following steps:

201. Receive a device capability invocation request sent by an active widget, where the device capability invocation request carries conditions of a device capability that needs to be invoked.

The conditions of device capability that needs to be invoked include: type of the device capability that needs to be invoked, conditions that need to be fulfilled by the input parameters of the device capability that needs to be invoked, and conditions that need to be fulfilled by the output parameters of the device capability that needs to be invoked. The type of the device whose capability needs to be invoked includes widget device, standard ordinary device, and non-standard ordinary device.

The widget may be compiled by the user as required, and may run on different widget devices simultaneously. Specifically, the widget is executed through a widget engine. When the widget engine runs the widget, the widget engine sends a device capability invocation request if it is determined that the widget needs to invoke the device capabilities.

202. Search a device capability database for the device capability compliant with the conditions. The device capability database stores registered capabilities of devices.

Specifically, if the widget device maintains a local device capability database, the step of searching the device capability database for the device capabilities compliant with conditions may include: searching the locally maintained local device capability database for the device capability compliant with conditions.

After the widget device maintains the local device capability database, if no device capability compliant with conditions is found in the local device capability database, or if the widget device does not maintain the local device capability database, the step of searching the device capability database for the device capability compliant with conditions may include: forwarding a device capability invocation request to the device capability server through the widget server so that the device capability server can search for the device capability compliant with conditions in the overall device capability database maintained by the device capability server.

203. Invoke the found device capability.

Specifically, when the device capability compliant with conditions is found in the local device capability database, the found device capability may be invoked from the local device (widget device) directly. Specifically, a request may be sent to a functional unit corresponding to the device capability that needs to be invoked. In this way, the functional unit runs, and an invocation result is obtained. For example, if the device capability that needs to be invoked is vibration, a request may be sent to the vibrating unit. After receiving the request, the vibrating unit starts vibrating. After completion of vibrating, a vibration completion message may be returned as an invocation result so that the widget learns completion of the vibration.

After the device capability compliant with conditions is found in the overall device capability database, the widget device needs to invoke the found device capability from the device corresponding to the found device capability through the device capability server. Specifically, after the device capability server receives the device capability invocation request, if the corresponding device capability is found in the overall device capability database, the device capability server may send a request to the device corresponding to the found device capability. After receiving this request, the device corresponding to the device capability makes the corresponding functional unit run, so as to obtain an invocation result. For example, if the device capability that needs to be invoked is videorecording, the device capability server sends a request to a camera after finding the camera compliant with conditions. After receiving the request, the camera runs and obtains a photo, and returns the obtained photo to the device capability server as an invocation result. The device capability server sends the photo to the widget device through the widget server.

204. Receive the invocation result that is returned after the found device capability is invoked.

Specifically, the device corresponding to the found device capability obtains the corresponding invocation result after the device capability is invoked. The device may return the invocation result. Specifically, if the device is a local device, the invocation result may be returned directly; if the device is a non-local device, the invocation result needs to be returned through the device capability server and the widget server.

For example, if the widget needs to obtain the current temperature in Beijing, the device corresponding to the found device capability obtains the current temperature in Beijing after the device capability is invoked, and returns the current temperature in Beijing as an invocation result.

205. Send the invocation result to the widget.

The invocation result is sent to the widget so that the widget can perform subsequent operations.

The widget device in this embodiment runs a widget that needs to invoke a device capability; receives a device capability invocation request sent by an active widget; searches the device capability database for a device capability compliant with conditions specified in the device capability invocation request; and invokes the found device capability and obtains an invocation result. Therefore, the widget can be executed correctly, and all device capabilities registered in the device capability database can be found and invoked, which makes full use of device resources in the system.

Figure 3A:
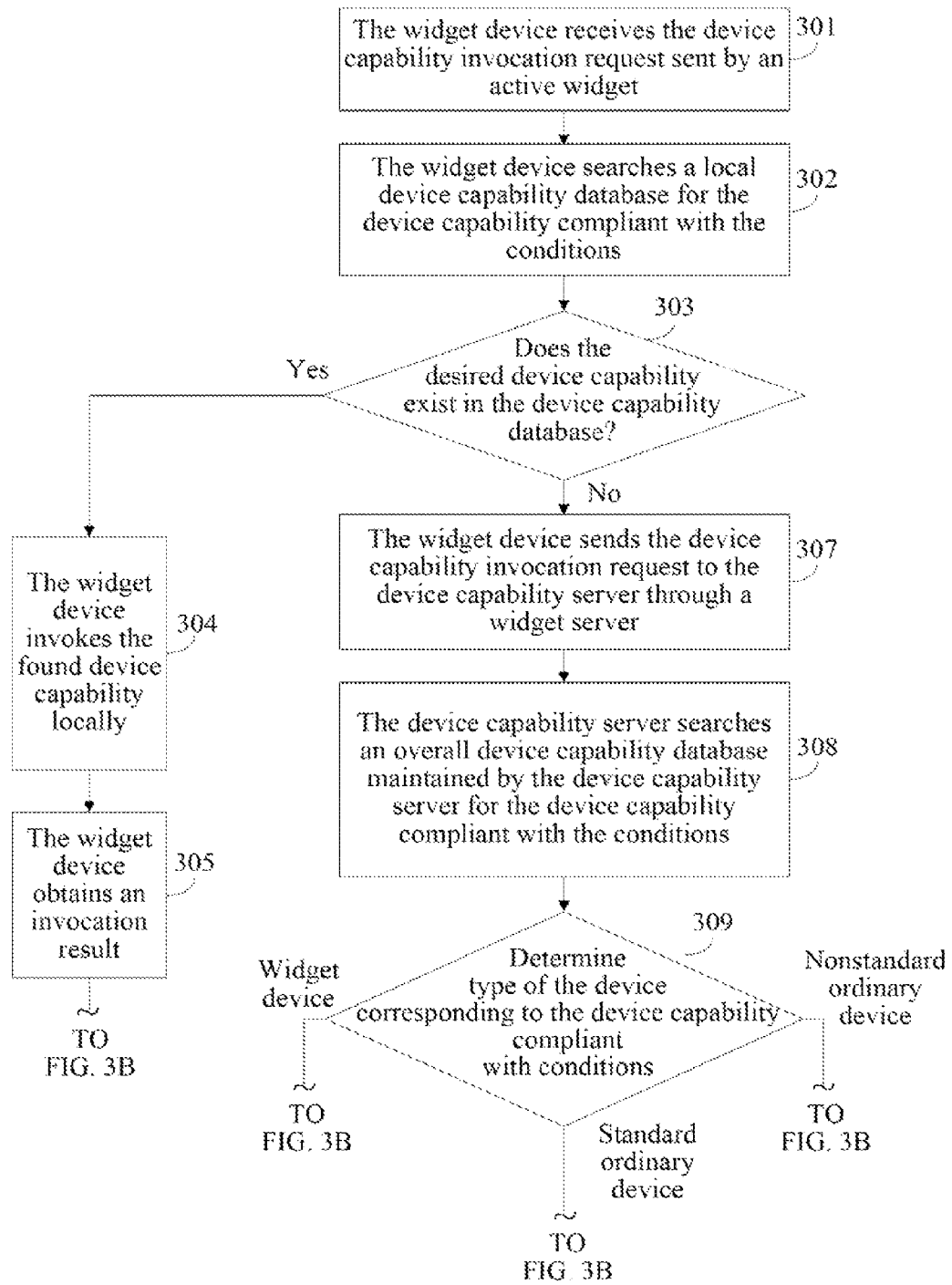
FIGS. 3A and 3B are flowcharts of a device capability invocation method according to a second embodiment of the present invention.
Figure 3B:
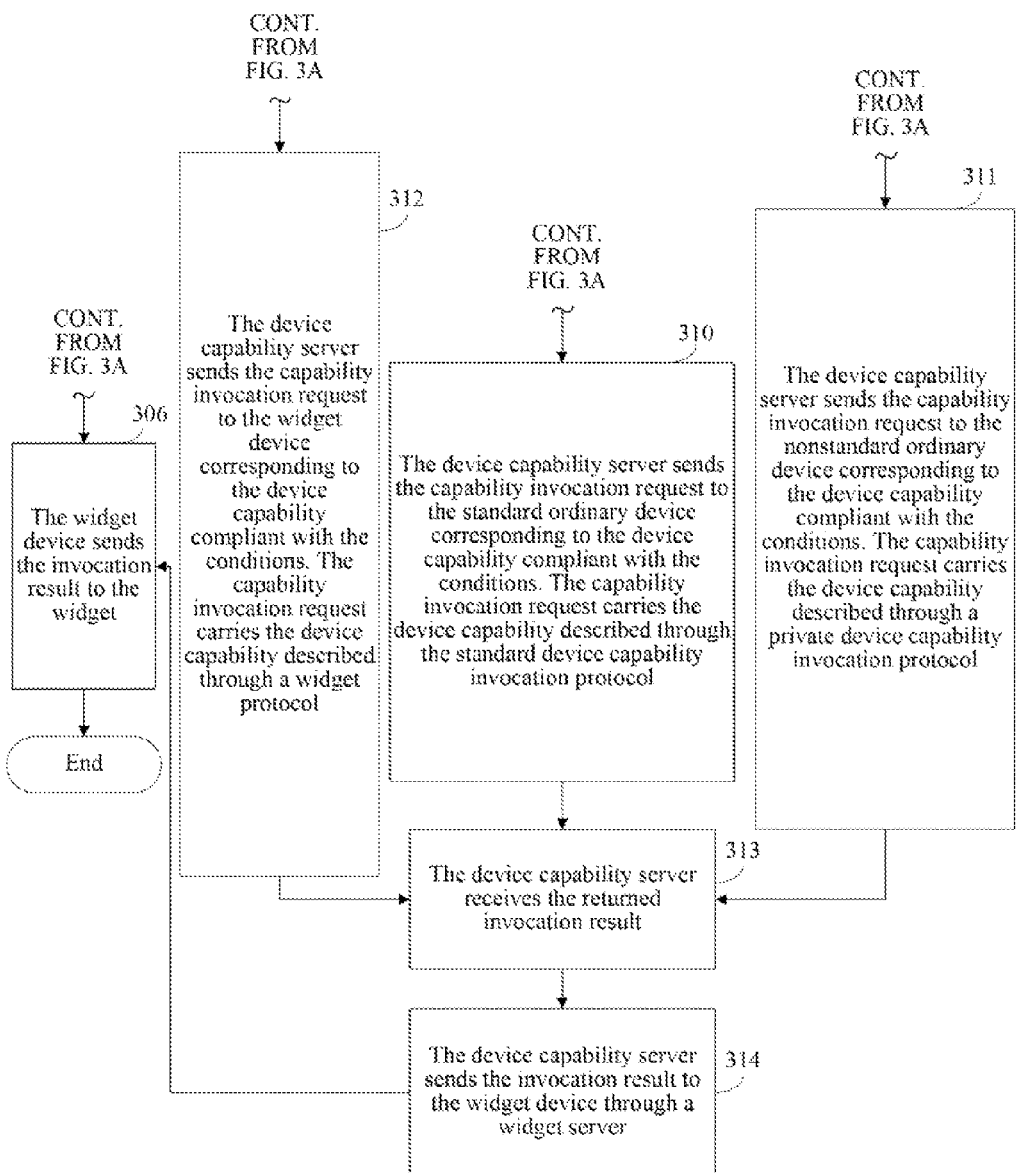

FIG. 3 is a flowchart of a device capability invocation method according to a second embodiment of the present invention. The method includes the following steps:

301. A widget device receives a device capability invocation request sent by an active widget, where the device capability invocation request carries conditions of a device capability that needs to be invoked.

The conditions of the device capability that needs to be invoked include: type of the device capability that needs to be invoked, conditions that need to be fulfilled by the input parameters of the device capability that needs to be invoked, and conditions that need to be fulfilled by the output parameters of the device capability that needs to be invoked.

302. The widget device searches a local device capability database for the device capability compliant with the conditions. The local device capability database stores registered capabilities of the local device (a widget device).

303. The widget device judges whether the device capability compliant with conditions can be found in the local device capability database. If the device capability compliant with conditions can be found in the local device capability database, the procedure proceeds to step 304; if the device capability compliant with conditions cannot be found in the local device capability database, the procedure proceeds to step 307.

304. The widget device invokes the found device capability from the widget device itself.

Specifically, the widget device may send a request to a functional unit corresponding to the found device capability. In this way, the functional unit runs, and an invocation result is obtained.

305. The widget device obtains the invocation result.

306. The widget device sends the invocation result to the widget, and the procedure ends.

307. The widget device sends the device capability invocation request to the device capability server through a widget server.

308. The device capability server searches an overall device capability database maintained by the device capability server for the device capability compliant with the conditions.

In this embodiment, a case that the device capability compliant with the conditions can be found in the overall device capability database is described. If no device capability compliant with the conditions can be found in the overall device capability database, the procedure ends directly.

309. The device capability server determines the device type of the device corresponding to the device capability compliant with the conditions. If the device type is a nonstandard ordinary device, the procedure proceeds to step 311; if the device type is a standard ordinary device, the procedure proceeds to step 310; if the device type is a widget device, the procedure proceeds to step 312.

In this embodiment of the present invention, a standard ordinary device refers to an ordinary device that supports a standard device capability registration protocol and a standard device capability invocation protocol; and correspondingly, a nonstandard ordinary device refers to an ordinary device that supports neither the standard device capability registration protocol nor the standard device capability invocation protocol. For example, for a camera, if the camera supports the standard device capability registration protocol and the standard device capability invocation protocol, the camera is a standard ordinary device; if the camera supports neither the standard device capability registration protocol nor the standard device capability invocation protocol, the camera is a nonstandard ordinary device.

310. The device capability server sends the capability invocation request to the standard ordinary device corresponding to the device capability compliant with the conditions. The capability invocation request carries the device capability that is described through a standard device capability invocation protocol to invoke the standard ordinary device's device capability compliant with the conditions. The procedure proceeds to step 313.

Specifically, after receiving the capability invocation request from the device capability server, the device corresponding to the device capability compliant with the conditions determines the device capability that needs to be invoked by the device capability server. Therefore, this device uses the corresponding device capability, and obtains an invocation result.

The standard device capability invocation protocol and the standard device capability registration protocol belong to the same protocol database.

311. The device capability server sends the capability invocation request to the nonstandard ordinary device corresponding to the device capability compliant with the conditions. The capability invocation request carries the device capability that is described through a private device capability invocation protocol to invoke the nonstandard ordinary device's device capability compliant with the conditions. The procedure proceeds to step 313.

The device capability that is described through a private device capability invocation protocol and carried in the capability invocation request is obtained as a result of conversion performed by the device capability server.

The private device capability invocation protocol and the private device capability registration protocol supported by different devices may belong to different protocol databases, but the private device capability invocation protocol and the private device capability registration protocol supported by the same device belong to the same protocol database.

Because the private device capability invocation protocols supported by the nonstandard ordinary devices may be different, the device capability server may maintain a device capability invocation protocol database in order to make the device capability server convert the device capability into a device capability that is described through a private device capability invocation protocol. In this way, the device capability server can directly convert, according to the records in the device capability invocation protocol database, the device capability into a device capability that is described through a private device capability invocation protocol, and does not need to perform ergodic matching for all private device capability invocation protocols, so as to improve the conversion speed.

Table 5 shows formats of records in a device capability invocation protocol database maintained by a device capability server in an embodiment of the present invention.

TABLE 5

| Device ID | Device capability | Device capability invocation protocol |
| --- | --- | --- |
| Device1 | widget.vibrate | Vibrate /elapse /span |
| Device2 | widget.vibrate | Tremble /elapse /span |
| Device1 | widget.tune | Tune /tune__id /elapse /volume |
| Device2 | widget.tune | Beep /elapse /volume |
| Device1 | widget.light | Flash -elapse |
| Device7 | widget.camera | Record -mode |
| ... | ... | ... |

312. The device capability server sends the capability invocation request to the widget device corresponding to the device capability compliant with the conditions. The capability invocation request carries the device capability that is described through a widget protocol to invoke the widget device's device capability compliant with the conditions.

313. The device capability server receives the returned invocation result.

After receiving the capability invocation request sent by the device capability server, the nonstandard ordinary device, the standard ordinary device, and the widget device run the corresponding capability, obtain an invocation result, and return the invocation result to the device capability server.

314. The device capability server sends the invocation result to the widget device through a widget server. The procedure proceeds to step 306.

In this embodiment, the widget device runs a widget that needs to invoke a device capability; receives a device capability invocation request sent by the active widget; searches the local device capability database and the overall device capability database for the device capability compliant with conditions specified in the device capability invocation request; and invokes the found device capability and obtains an invocation result. Therefore, the widget can be executed correctly. If the found device capability is the capability of the widget device itself, the device capability can be invoked directly, which improves the speed of executing the widget. Moreover, all device capabilities registered in the device capability database can be found and invoked, namely, the capabilities of the devices in a system can be invoked by the devices in the system, which makes full use of device resources in the system.

Figure 4:
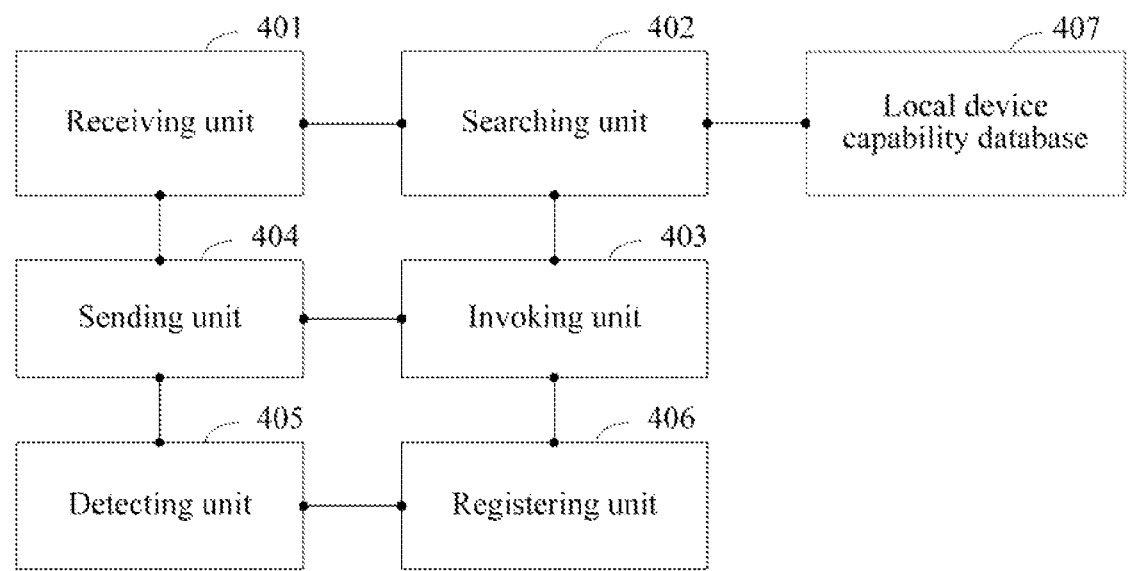
FIG. 4 is a structure diagram of a widget device according to a first embodiment of the present invention.

A widget device is provided in an embodiment of the present invention. As shown in FIG. 4, a structure of a widget device according to a first embodiment of the present invention is described, and the widget device includes: a receiving unit 401, a searching unit 402, an invoking unit 403, and a sending unit 404.

The receiving unit 401 is configured to: receive a device capability invocation request sent by an active widget, where the device capability invocation request carries conditions of a device capability that needs to be invoked; and receive an invocation result that is sent after the device capability is invoked by the invoking unit 403.

The device capability invocation request may be specifically sent by a widget engine of the widget device when the widget is active.

The searching unit 402 is configured to search for the device capability compliant with the conditions specified in the device capability invocation request received by the receiving unit 401. The device capability database stores device capabilities that are registered by the devices and are allowable for invocation. In an embodiment of the present invention, the searching unit 402 may search a local device capability database 407 maintained by the widget device for the device capability compliant with conditions. In another embodiment of the present invention, the searching unit 402 may search an overall device capability database maintained by the device capability server for the device capability compliant with the conditions.

The invoking unit 403 is configured to invoke the device capability found by the searching unit 402.

Specifically, if the device capability found by the searching unit 402 is the device capability of the widget device itself, the invoking unit 403 may directly send a capability invocation request to the functional unit corresponding to the found device capability through the sending unit 404; if the device capability found by the searching unit 402 is the device capability of other devices in the system, the invoking unit 403 may invoke the device capability of other devices through a widget server and a device capability server. Other devices may be widget devices or ordinary devices.

The sending unit 404 is configured to send the invocation result received by the receiving unit 401 to the widget.

The widget device in this embodiment runs a widget that needs to invoke a device capability; receives a device capability invocation request sent by an active widget; searches the device capability database for device capability compliant with conditions specified in the device capability invocation request; and invokes the found device capability and obtains an invocation result. Therefore, the widget can be executed correctly, and all device capabilities registered in the device capability database can be found and invoked, which makes full use of device resources in the system.

In an embodiment of present invention, the widget device further includes a detecting unit 405 and a registering unit 406.

The detecting unit 405 is configured to detect the device capabilities that the widget device has.

The registering unit 406 is configured to register the device capabilities detected by the detecting unit 405 into the device capability database.

At this time, the sending unit 404 is further configured to: send the device capabilities detected by the detecting unit 405 to the device capability server through the widget server so that the device capability server registers the device capabilities detected by the detecting unit 405 into the device capability database maintained by the device capability server; and send a device capability invocation request received by the receiving unit 401 to the device capability server through a widget server when the searching unit 402 finds no device capability compliant with the conditions from the device capability database, so that the device capability server can search for the device capability compliant with the conditions in the device capability database maintained by the device capability server. The device capability database maintained by the device capability server may be an overall device capability database.

If the widget device provided in this embodiment of the present invention finds no device capability compliant with the conditions from the locally maintained device capability database, the widget device may search the device capability database maintained by the device capability server for the device capability compliant with the conditions. In this way, it can be ensured that the widget can be executed correctly, and the device resources in the system can be made full use of.

Figure 5:
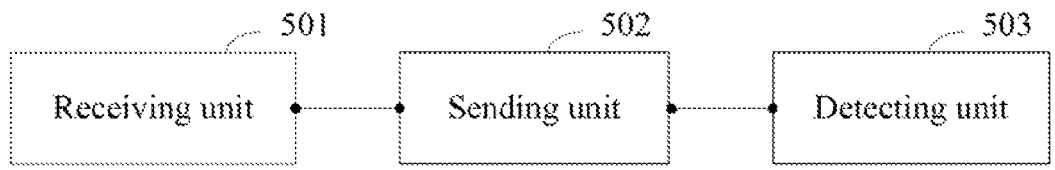
FIG. 5 is a structure diagram of a widget device according to a second embodiment of the present invention.

FIG. 5 shows a structure of a widget device in a second embodiment. The widget device includes a receiving unit 501 and a sending unit 502.

The receiving unit 501 is configured to: receive a device capability invocation request sent by an active widget, where the device capability invocation request carries conditions of a device capability that needs to be invoked; and receive an invocation result sent by the device capability server through a widget server.

The device capability invocation request may be specifically sent by a widget engine of the widget device when the widget is active.

The sending unit 502 is configured to: send the device capability invocation request received by the receiving unit 501 to the device capability server through the widget server so that the device capability server can search for the device capability compliant with the conditions in an overall device capability database, invoke the found device capability, and obtain an invocation result; and send the invocation result received by the receiving unit 501 to the widget.

The widget device in this embodiment can run a widget that needs to invoke a device capability; receives a device capability invocation request sent by an active widget; and invokes the device capability of the device in the system through a device capability server and obtains an invocation result. Therefore, the widget can be executed correctly, and all device capabilities registered in the device capability database can be found and invoked, which makes full use of device resources in the system.

In a second embodiment, the widget device may further include a detecting unit 503 which is configured to detect the device capabilities that the widget device has.

At this time, the sending unit 502 may be further configured to send the device capability detected by the detecting unit 503 to the device capability server through a widget server so that the device capability server can register the device capabilities detected by the detecting unit 502 into the device capability database maintained by the device capability server. The device capability database maintained by the device capability server may be an overall device capability database.

Figure 6:
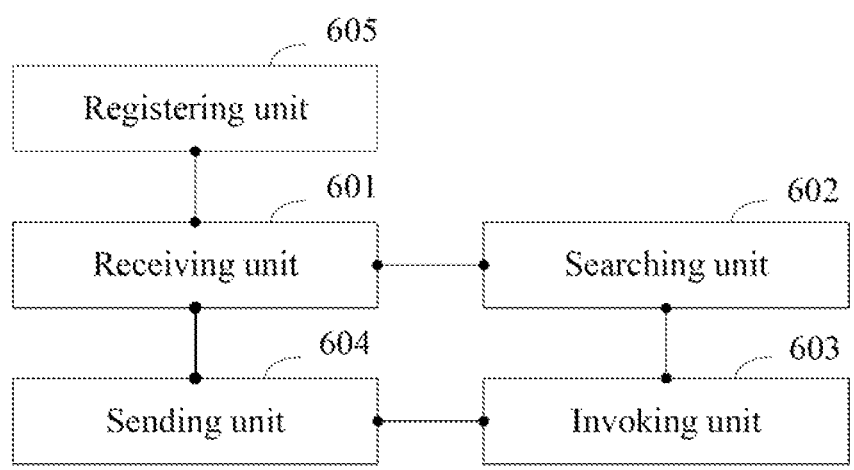
FIG. 6 is a structure diagram of a server according to an embodiment of the present invention.

A server is provided in an embodiment of the present invention. As shown in FIG. 6, a structure of the server in the embodiment is described, and the server includes: a receiving unit 601, a searching unit 602, an invoking unit 603, and a sending unit 604.

The receiving unit 601 is configured to: receive a device capability invocation request sent by a widget device through a widget server, where the device capability invocation request carries conditions of a device capability that needs to be invoked: and receive an invocation result that is sent after the device capability found by the searching unit 602 is invoked by the invoking unit 603.

The searching unit 602 is configured to search an overall device capability database for the device capability compliant with the conditions specified in the device capability invocation request received by the receiving device 601.

The invoking unit 603 is configured to invoke the device capability found by the searching unit 602.

Specifically, in an embodiment of the present invention, the invoking unit 603 may send, through the sending unit 604, a capability invocation request to the device corresponding to the device capability found by the searching unit 602, so as to invoke the corresponding device capability on the device.

The sending unit 604 is configured to send the invocation result received by the receiving unit 601 to the widget device through the widget server.

In the embodiment described above, the server receives a device capability invocation request sent by a widget device, searches for the corresponding device capability in an overall device capability database, invokes the found device capability, obtains an invocation result, and sends the invocation result to the widget device. Therefore, the widget in the widget device can be executed correctly, and all device capabilities registered in the overall device capability database can be found and invoked, which makes full use of device resources in the system.

In the embodiment of the present invention, the receiving unit 601 included by the server may be further configured to receive the device capabilities sent by the device. At this time, the server may further include a registering unit 605, which is configured to register the device capabilities received by the receiving unit 601 into the overall device capability database.

The server provided in this embodiment of the present invention may act as a device capability server.

Persons of ordinary skill in the art should understand that all or part of the steps of the method provided in the embodiments above may be implemented by a computer program instructing relevant hardware. The program may be stored in computer readable storage media. When the program runs, the program executes the steps of the method specified in any embodiment above. The storage media may be a magnetic disk. CD-ROM, Read-Only Memory (ROM), or Random Access Memory (RAM).

A device capability invocation method, a widget device, and a server provided by the embodiments of the present invention are described in detail above. The exemplary embodiments described above are merely for better understanding the method and principle of the present invention, and the invention is not limited to such embodiments. It is apparent that based on the exemplary embodiments and application scope of the present invention, those skilled in the art can make modifications and variations to the invention without departing from the principle of the invention. The invention is intended to cover the modifications and variations provided that they fall in the scope of protection defined by the following claims or their equivalents.

What is claimed is:

1. A method performed by a device capability server for invocating a device capability applied to a device capability system, comprising:

receiving a capability invocation request sent by a widget device through a widget server in the device capability system, wherein the capability invocation request carries conditions of a device capability that needs to be invoked, wherein the device capability system comprises a plurality of devices, wherein the plurality of devices comprises the widget device, an ordinary device, the widget server, and the device capability server, wherein the ordinary device is a device that cannot be installed with a widget engine;

searching a device capability database for a device capability compliant with the conditions of the device capability that needs to be invoked, wherein the device capability database stores registered capabilities of devices in the device capability system, wherein a device capability in the device capability database can be invoked by the widget device and by any other widget devices in the device capability system;

determining a device type of a device corresponding to the device capability compliant with the conditions;

sending the capability invocation request to a standard ordinary device corresponding to the device capability compliant with the conditions when the device corresponding to the device capability compliant with the conditions is the standard ordinary device, wherein the standard ordinary device comprises an ordinary device that supports a standard device capability registration protocol and a standard device capability invocation protocol, and wherein the capability invocation request carries the device capability that is described through the standard device capability invocation protocol to invoke the standard ordinary device's device capability compliant with the conditions; and sending, through the widget server, the invocation result to the widget device that sent the capability invocation request;

wherein the device capability database comprises a table of entries, and wherein the table of entries comprises a first column for device capabilities, a second column for device identifiers, a third column for ranges of input parameters, and a fourth column for ranges of output parameters.

2. The method according to claim 1, wherein the conditions of the device capability that needs to be invoked comprise:
a type of the device capability that needs to be invoked; or
a type of the device capability that needs to be invoked, conditions that need to be fulfilled by input parameters of the device capability that needs to be invoked, and conditions that need to be fulfilled by output parameters of the device capability that needs to be invoked.

3. A widget device for invocating a device capability applied to a device capability system, comprising:
a memory configured to store instructions; and
a processor coupled to the memory and configured to execute the instructions to:
receive a capability invocation request sent by a widget, wherein the capability invocation request carries conditions of a device capability that needs to be invoked, wherein the device capability system comprises a plurality of devices, wherein the plurality of devices comprises the widget device, an ordinary device, a widget server, and a device capability server, wherein the ordinary device is a device that cannot be installed with a widget engine;
search a local device capability database maintained locally for the device capability compliant with the conditions, wherein the local device capability database stores device capabilities registered by the widget device;
send the capability invocation request through the widget server to the device capability server when the device capability compliant with the conditions cannot be found in the local device capability database, wherein the capability invocation request sent to the device capability server instructs the device capability server to search a device capability database for a device capability compliant with the conditions of the device capability that needs to be invoked, wherein the device capability database stores registered capabilities of devices in the device capability system, wherein a device capability in the device capability database can be invoked by the widget device and by any other widget devices in the device capability system, wherein the capability invocation request carries the device capability that is described through a standard device capability invocation protocol to invoke a standard ordinary device's device capability compliant with the conditions, wherein a device type of the device corresponding to the device capability compliant with the conditions is determined as a standard ordinary device, and wherein the standard ordinary device comprises an ordinary device that supports a standard device capability registration protocol and the standard device capability invocation protocol;
receive, through the widget server, the invocation result from the device capability server wherein the invocation result carries an operation result of the standard ordinary device; and
send the invocation result to the widget.

4. The widget device according to claim 3, wherein the processor is further configured to execute the instructions to:
detect device capabilities that the widget device has locally; and
send the device capabilities detected by the widget device to the device capability server through the widget server such that the device capability server registers the device capabilities detected by the widget device into the device capability database maintained by the device capability server.

5. The method according to claim 1, wherein the device corresponding to the device capability compliant with the conditions is a nonstandard ordinary device, wherein sending the capability invocation request to the one of the plurality of devices comprises sending the capability invocation request to the nonstandard ordinary device, and wherein the capability invocation request carries the device capability compliant with the conditions that is described through a private device capability invocation protocol to invoke the device capability compliant with the conditions on the nonstandard ordinary device.

6. The method according to claim 1, wherein the device corresponding to the device capability compliant with the conditions is a widget device, wherein sending the capability invocation request to the widget device corresponding to the device capability compliant with the conditions, and wherein the capability invocation request carries the device capability compliant with the conditions that is described through a widget protocol to invoke the device capability compliant with the conditions on the widget device corresponding to the device capability compliant with the conditions.

7. A method performed by a widget device for invocating a device capability applied to a device capability system, comprising:
receiving a capability invocation request sent by a widget, wherein the capability invocation request carries conditions of a device capability that needs to be invoked, wherein the device capability system comprises a plurality of devices, wherein the plurality of devices comprises the widget device, an ordinary device, a widget server, and a device capability server, wherein the ordinary device is a device that cannot be installed with a widget engine;
searching a local device capability database maintained locally for the device capability compliant with the conditions, wherein the local device capability database stores device capabilities registered by the widget device;

sending the capability invocation request through the widget server to the device capability server when the device capability compliant with the conditions cannot be found in the local device capability database, wherein the capability invocation request instructs the device capability server to search a device capability database maintained by the device capability server for a device capability compliant with the conditions of the device capability that needs to be invoked, wherein the device capability database maintained by the device capability server stores registered capabilities of devices in the device capability system, wherein a device capability in the device capability database can be invoked by the widget device and by other widget devices in the device capability system, wherein the capability invocation request carries the device capability that is described through a standard device capability invocation protocol to invoke a standard ordinary device's device capability compliant with the conditions, wherein a device type of the device corresponding to the device capability compliant with the conditions is determined as a standard ordinary device, and wherein the standard ordinary device comprises an ordinary device that supports a standard device capability registration protocol and the standard device capability invocation protocol;

receiving, through the widget sever, the invocation result from the device capability server, wherein the invocation result carries an operation result of the standard ordinary device; and sending the invocation result to the widget.

8. The method according to claim 7, further comprising:

detecting device capabilities that the widget device has locally; and sending the device capabilities detected by the widget device to the device capability server through the widget server such that the device capability server registers the device capabilities detected by the widget device into the device capability database maintained by the device capability server.

9. A device capability server for invocating a device capability applied to a device capability system, comprising:

a computer readable storage media configured to store instructions; and a processor coupled to the computer readable storage media and configured to run the instructions to execute the steps of:

receiving a capability invocation request sent by a widget device through a widget server in the device capability system, wherein the capability invocation request carries conditions of a device capability that needs to be invoked, wherein the device capability system comprises a plurality of devices, wherein the plurality of devices comprises the widget device, an ordinary device, the widget server, and the device capability server, wherein the ordinary device is a device that cannot be installed with a widget engine;

searching a device capability database for a device capability compliant with the conditions of the device capability that needs to be invoked, wherein the device capability database stores registered capabilities of devices in the device capability system, wherein a device capability in the device capability database can be invoked by the widget device and by any other widget devices in the device capability system;

determining the device type of the device corresponding to the device capability compliant with the conditions;

sending the capability invocation request to a standard ordinary device corresponding to the device capability compliant with the conditions when the device corresponding to the device capability compliant with the conditions is the standard ordinary device, wherein the standard ordinary device comprises an ordinary device that supports a standard device capability registration protocol and a standard device capability invocation protocol, and wherein the capability invocation request carries the device capability that is described through the standard device capability invocation protocol to invoke the standard ordinary device's device capability compliant with the conditions;

sending the capability invocation request to one of the plurality of devices in the device capability system that corresponds to the device capability compliant with the conditions to invoke the device capability compliant with the conditions; and sending, through the widget server, the invocation result to the widget device that sent the capability invocation request;

wherein the device capability database comprises a table of entries, and wherein the table of entries comprises a first column for device capabilities, a second column for device identifiers, a third column for ranges of input parameters, and a fourth column for ranges of output parameters.

10. The device capability server according to claim 9, wherein the conditions of the device capability that needs to be invoked comprise a type of the device capability that needs to be invoked.

11. The device capability server according to claim 9, wherein the conditions of the device capability that needs to be invoked comprise a type of the device capability that needs to be invoked, conditions that need to be fulfilled by input parameters of the device capability that needs to be invoked, and conditions that need to be fulfilled by output parameters of the device capability that needs to be invoked.

12. The device capability server according to claim 9 wherein the first column for device capabilities comprises a number of rows, wherein each of the rows corresponds to a different device capability, and wherein the device capabilities comprise a vibrate capability, a tune capability, a light capability, and a camera capability.

13. The device capability server according to claim 12, wherein the second column for device identifiers comprises a number of rows, wherein each of the rows corresponds to one or more different devices, and wherein a same device is included in at least two different rows.

14. The device capability server according to claim 13, wherein the third column for ranges of input parameters comprises a number of rows, wherein each of the rows corresponds to one or more different parameters, and wherein the different parameters comprise an elapse parameter, a span parameter, a tune parameter, a volume parameter, and a mode parameter.

15. The device capability server according to claim 14, wherein the fourth column for ranges of output parameters comprises a number of rows, wherein at least one of the rows has an output parameter, and wherein the output parameter comprises an image parameter.

* * * * *

UNITED STATES PATENT AND TRADEMARK OFFICE
CERTIFICATE OF CORRECTION

| | | |
|---|---|---|
| PATENT NO. | : 9,094,468 B2 | Page 1 of 1 |
| APPLICATION NO. | : 13/294659 | |
| DATED | : July 28, 2015 | |
| INVENTOR(S) | : Hongbo Jin, Haifang Fu and Wangbin Zhu | |

It is certified that error appears in the above-identified patent and that said Letters Patent is hereby corrected as shown below:

Title Page

(30) Foreign Application Priority Data Section should read:

(30) May 12, 2009   (CN) ..........................200910138673.2

(56) Other Publications Section should read:

International Search Report from P.R. China in International Application No. PCT/CN2010/072655, mailed August 19, 2010.

Claims

Column 18, Line 43, Claim 12 should read:

The device capability server according to claim 9, wherein the first column for device capabilities comprises a number of rows, wherein each of the rows corresponds to a different device capability, and wherein the device capabilities comprise a vibrate capability, a tune capability, a light capability, and a camera capability.

Signed and Sealed this
Ninth Day of February, 2016

Michelle K. Lee
*Director of the United States Patent and Trademark Office*